United States Patent
Schiff

(10) Patent No.: US 9,481,468 B1
(45) Date of Patent: Nov. 1, 2016

(54) AIRCRAFT ENVIRONMENTAL CONTROL SYSTEM

(76) Inventor: Peter Schiff, Cookeville, TN (US)

( * ) Notice: Subject to any disclaimer, the term of this patent is extended or adjusted under 35 U.S.C. 154(b) by 991 days.

(21) Appl. No.: 13/189,439

(22) Filed: Jul. 22, 2011

(51) Int. Cl.
*F25D 9/00* (2006.01)
*B64D 13/00* (2006.01)
*F25D 23/00* (2006.01)
*B64D 11/00* (2006.01)

(52) U.S. Cl.
CPC .................................. *B64D 13/00* (2013.01)

(58) Field of Classification Search
CPC ......... F25D 9/00; F25D 23/00; B64D 13/00; B64D 13/02; B64D 13/06; B64D 13/08; B64D 11/00; B60H 1/036; B60H 1/18; B60H 1/32; B64C 13/04; B64C 103/02
USPC ....... 62/87, 61, 241, 244, 88, 196.4; 454/70, 454/71, 76
See application file for complete search history.

(56) References Cited

U.S. PATENT DOCUMENTS

| | | | |
|---|---|---|---|
| 3,537,510 A | 11/1970 | Rennenberg | |
| 6,158,217 A * | 12/2000 | Wang | F02B 29/0412 60/599 |
| 6,283,410 B1 * | 9/2001 | Thompson | 244/59 |
| 7,305,842 B1 * | 12/2007 | Schiff | 62/244 |
| 2003/0005718 A1 * | 1/2003 | Mitani et al. | 62/402 |
| 2009/0249808 A1 * | 10/2009 | Ullman et al. | 62/119 |

* cited by examiner

*Primary Examiner* — Frantz Jules
*Assistant Examiner* — Erik Mendoza-Wilkenfe
(74) *Attorney, Agent, or Firm* — LaMorte & Associates, P.C.

(57) ABSTRACT

An environmental control system for an aircraft. The environmental control system is powered by engine bleed air. A primary turbocharger is provided that includes a first turbine and a first compressor. The first turbine is powered by the engine bleed air. The first compressor draws ambient air and creates a first compressed air supply without ever exposing the first compressed air supply to the engine bleed air. A secondary turbocharger is provided that has a second compressor and an expansion turbine. The second compressor further compresses the first compressed air supply to create a second compressed air supply. A heat exchanger is provided that cools the second compressed air supply to create a cooled compressed air supply. The cooled compressed air supply powers the expansion turbine. This causes the cooled compressed air supply to losing both heat and pressure to become a conditioned air supply.

9 Claims, 3 Drawing Sheets

AIRCRAFT ENVIRONMENTAL CONTROL SYSTEM

BACKGROUND OF THE INVENTION

1. Field of the Invention

In general, the present invention relates to environmental control systems for aircraft that have pressurized cabins. More particularly, the present invention relates to environmental control units that utilize secondary turbines to compress ambient air, wherein the secondary turbines are driven by the bleed air from an aircraft engine.

2. Prior Art Description

Low flying, relatively slow aircraft do not require sophisticated environmental control systems for the inside of the aircraft cabin. The quality of the air within the aircraft cabin can be adjusted by simply opening and closing vents or windows. However, many modern aircraft are designed to fly at high altitudes and at high speeds. Such aircraft require pressurized cabins, where the pressure within the aircraft is artificially maintained. If an aircraft cabin is pressurized, fresh ambient air cannot simply be vented into the pressurized cabin from outside the aircraft. Rather fresh air must be compressed to a pressure that matches that of the interior of the pressurized cabin so that the fresh air will flow into the pressurized cabin.

Aircraft that are designed to fly at high altitudes typically have jet engines or turboprop engines. Such turbine engines have compressors that can compress air to pressures above one hundred pounds per square inch. As the air is compressed, it is heated and may achieve temperatures of over five hundred degrees Fahrenheit at sea level. Fuel is then added to the compressed air and ignited in a separate combustion section of the aircraft engine.

Air can be bled from the compression chamber of the engine, prior to the compressed air becoming mixed with the fuel. By bleeding some air from the engine, a source of high temperature/high pressure air can be obtained. In early designs for aircraft environmental control systems, engine bleed air was directly used to feed air into a pressurized cabin. Such an environmental control system is exemplified by U.S. Pat. No. 3,537,510 to Rennenberg, entitled Pressure And Temperature Regulator For Aircraft Bleed Air System.

Since engine bleed air is typically at a high pressure and at a high temperature, sophisticated heat exchangers and pressure regulators must be used to condition the bleed air so it is at the correct temperature and pressure to be introduced into the cabin. Should a component fail, high temperature bleed air could directly flow into the pressurized cabin, thereby quickly overheating the cabin and requiring the aircraft to land for safety concerns and repairs.

Although engine bleed air can be used to directly heat the passenger cabin of an aircraft, the bleed air itself is never cooler than the cabin and cannot be used to cool the cabin. Rather, in order to cool the passenger cabin of an aircraft, the hot, high-pressure bleed air is used to turn a secondary turbine. The secondary turbine is used to provide pressurized air to a secondary vapor cycle air conditioning system. Such a system is disclosed in U.S. Pat. No. 7,305,842 to Schiff, entitled Environmental Control System And Method For An Aircraft.

Vapor cycle air conditioning systems are advantageous in private jets and other smaller aircraft. Such systems have electrically powered air conditioning compressors. This enables the cabin of the aircraft to be cooled on the tarmac using ground power. Such systems also provide an efficient way to control the relative humidity in the cabin as the air conditioning evaporator approaches near freezing temperatures.

In large commercial aircraft, the volume of cabin air that must be conditioned is much greater than that of smaller private aircraft. Accordingly, the air conditioning system must be larger. The mechanical requirements and weight of a vapor cycle air conditioning system, therefore, become impractical. Instead, commercial aircraft use air conditioning systems that utilize an expansion turbine. The function of the expansion turbine in such prior art systems is to remove energy from the bleed flow air after it has been cooled by a heat exchanger. This cools the bleed airflow to a temperature below that of the aircraft cabin. The cooled bleed air can then be used to cool the aircraft cabin. Such prior art systems, however, are complex and require sophisticated heat exchangers. These systems also use substantial volumes of bleed air from the aircraft engines. Furthermore, although the air is cooled, it still contains bleed air and the contaminants that come with bleed air.

An obvious problem associated with such prior art environmental control systems is that although the engine bleed air is used to run an air cooling system, the bleed air starts at a high temperature before it is cooled. Thus, if a cooling component fails in the environmental control system, engine bleed air is directly fed into the passenger cabin and the passenger cabin can quickly overheat.

Another problem associated with such prior art systems is that a large flow of engine bleed air is needed to drive the cooling system. Thus, the cooling system may work well when the aircraft is in flight and the engine is at cruise power. However, when the aircraft is taxiing on the ground and the engines are idling, the cooling system works poorly.

Yet another problem associated with many prior art environmental control systems is that they require large volumes of bleed air from the engines. This results in direct power losses from the engines since it starves the engines of the high pressure air needed during combustion. Excess removal of bleed air from an engine also results in higher engine operating temperatures and increased maintenance requirements.

A need therefore exists for an improved environmental control system for an aircraft that can provide both heated air and cooled air for a pressurized cabin without ever directing engine bleed air, with its contaminants, into the cabin. In this manner, even when the environmental control system fails, engine bleed air will not flow into the pressurized cabin and the pressurized cabin will not overheat.

Many aircraft environmental systems use turbines. Whenever a high speed, high temperature turbine is used in an aircraft, the turbine must be continuously lubricated. Furthermore, the engines of the aircraft must have constant lubrication. There are many additives that are used in aircraft lubricants. Of particular significance are a grouped call tricresyl phosphates and organophosphates. These additives are used for their anti-wear properties. However, these same chemicals are also used in pesticides. Even trace amounts of these chemicals can have harmful and cumulative effects on susceptible humans.

Dangerous byproducts from the engine bleed air can be avoided by never allowing the engine bleed air to enter the passenger cabin. However, preventing lubricants from entering an aircraft's current environmental control system from the aircraft engines or a turbine that is part of that system has proven highly difficult. FIG. 7 of prior cited U.S. Pat. No. 7,305,842 shows a system that draws lubrication fumes out of turbocharger. However, this system relies upon a venturi valve that receives ram air during flight. Accordingly, the system only draws fumes when the aircraft is in flight and the ram is open. When the aircraft is on the tarmac, or when the ram is closed, no suction is produced and the lubrication fumes are unabated.

A need therefore also exists for an improved environmental air conditioning system for larger aircraft that provides air with less contaminants than has previously been achievable, both while the aircraft is in flight and at idle. This need is also met by the present invention as described and claimed below.

SUMMARY OF THE INVENTION

The present invention is an environmental control system for an aircraft that has a pressurized cabin. The environmental control system is powered by bleed air from an aircraft engine. A primary turbocharger is provided that includes a first turbine and a first compressor. The first turbine is powered by bleed air from the engine. The first compressor draws fresh ambient air from outside the aircraft and creates a first compressed air supply without ever exposing the first compressed air supply to the engine bleed air.

A secondary turbocharger is provided that has a second compressor and an expansion turbine. The second compressor further compresses the first compressed air supply to create a higher pressure second compressed air supply. A heat exchanger is provided that cools the second compressed air supply with ambient air to create a cooled compressed air supply. The cooled compressed air supply powers the expansion turbine. This causes the cooled compressed air supply to losing both heat and some pressure in order to become a conditioned air supply.

The conditioned air supply is introduced into the pressurized cabin to either heat or cool the pressurized cabin.

The turbochargers used in the environmental control system are vented to prevent any lubrication mist or fumes from mixing with the air that enters the pressurized cabin. Since the air entering the pressurized cabin contains no engine bleed air and no lubrication fumes, the conditioned air is clean and healthy to breathe.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention environmental control system can be used on any aircraft that uses a jet engine or turboprop engine, the present invention system is best suited for use on larger commercial aviation aircraft, having pressurized cabins that seat more than twelve people. Such aircraft typically have multiple engines. However, it will be understood that the illustrated embodiment is merely exemplary and should not be considered a limitation to the application of the system to other sized aircraft.

Figure 1:
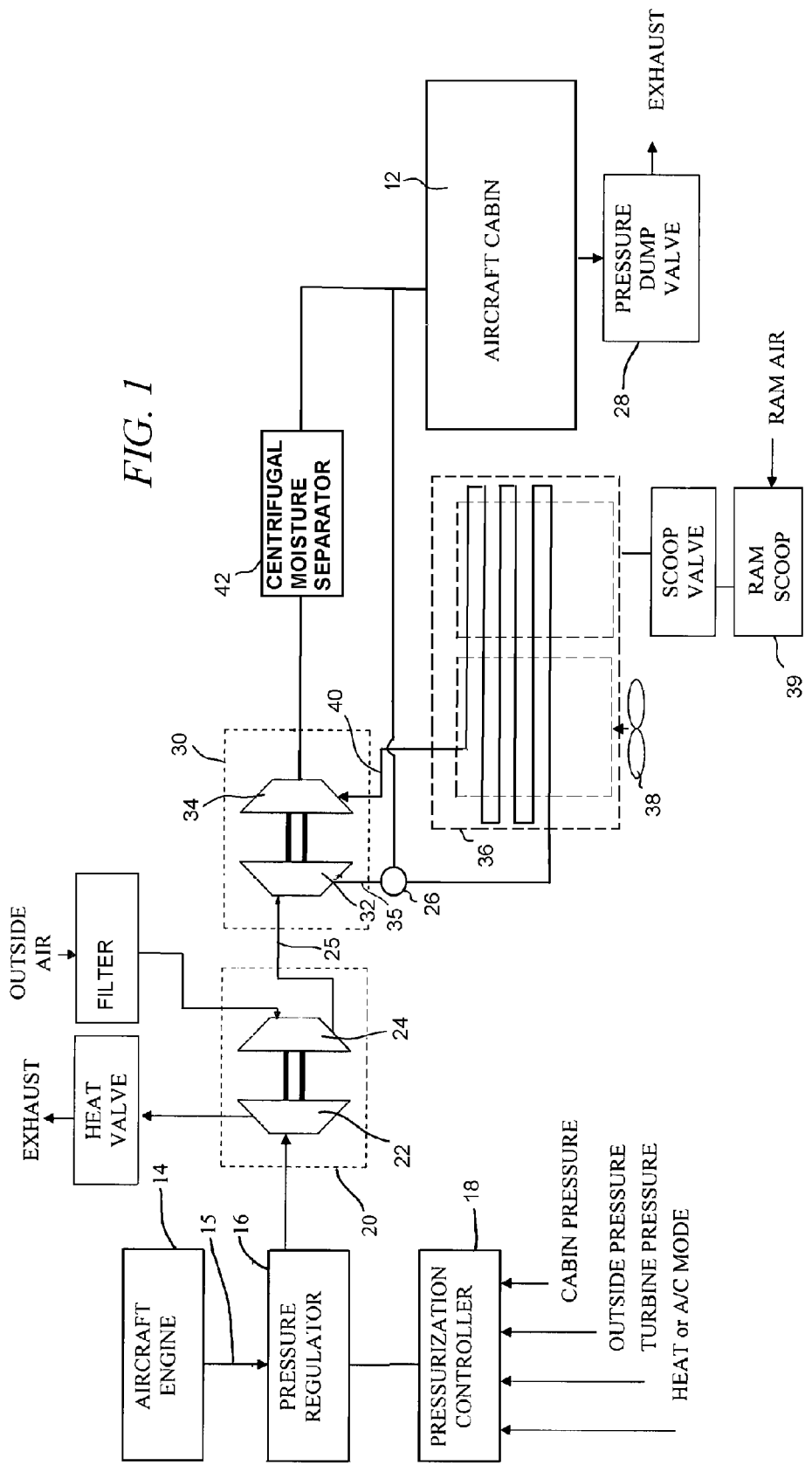
FIG. 1 is a schematic of an exemplary embodiment of the present invention environmental control system for an aircraft.

Referring to FIG. 1, there is a schematic of an exemplary embodiment of an environmental control system 10 as applied to an aircraft that has a pressurized cabin 12. The aircraft has at least one engine 14. The engine 14 can be either a jet engine or a turboprop engine, whereby the engine 14 has a turbine that compresses incoming air. As the engine 14 compresses air, the air is increased in both temperature and pressure. A volume of the high temperature/high pressure bleed air 15 from within the engine 14 is bled away for use by the environmental control system 10.

The bleed air 15 that is removed from the engine 14 is first passed through a pressure regulator 16. The pressure regulator 16 selectively varies the pressure of the bleed air 15 used by the environmental control system 10. A pressurization controller 18 controls the pressure regulator 16 and reduces the pressurization bump that occurs when the bleed air pump assembly is turned on after the aircraft has reached a significant altitude and a large pressure differential exists between the cabin 12 and outside air. The pressurization controller 18 can slowly increase the flow of bleed air 15, thereby slowly increasing the power provided to the primary turbocharger 20 within the environmental control system 10. The primary turbocharger 20 can therefore be brought up to the appropriate operating speed without any rapid drain of bleed air 15 from the engines 14 or any sudden activation of the primary turbocharger 20 from a dead stop.

The pressurization controller 18 also allows the bleed air 15 to be turned on or off when the aircraft operates at lower altitudes. When the aircraft descends to a low altitude, there is little or no pressure differential between the aircraft cabin 12 and the surrounding air. As a consequence, air does not have to be compressed prior to being introduced into the aircraft cabin 12.

The bleed air 15 that passes out of the pressure regulator 16 is fed directly to the primary turbocharger 20. The primary turbocharger 20 is comprised of a primary turbine 22 and a primary compressor 24. The energy from the hot, high-pressure bleed air 15 is used to turn the primary turbine 22. The spent bleed air that exits the primary turbine 22 either is exhausted from the aircraft or is used for heating, in a manner later described. The bleed air 15 is never directed into the pressurized cabin 12. Consequently, should the primary turbocharger 20 ever fail, the bleed air 15 would simply flow past the primary turbine 22 and be harmlessly vented from the aircraft.

The primary compressor 24 receives ambient air from outside the aircraft. If the aircraft is in flight at a high altitude, the pressure of the ambient air received by the primary compressor 24 is less than the pressure maintained within the pressurized cabin 12. The primary compressor 24 is preferably oversized and compresses the ambient air to a pressure that is significantly higher than the pressure within the cabin 12 when the environmental system 10 is in a "cooling" mode of operation. This creates a first compressed air supply 25 that has both a pressure and a temperature that is greater than the pressure and temperature in the pressurized cabin.

It will therefore be understood that the first turbocharger 20 interacts with two distinct and separate flows of air. The engine bleed air 15 is used to turn the primary turbine 22 and power the primary turbocharger 20. The fresh air that is compressed by the primary turbocharger 20 is eventually introduced into the pressurized cabin 12. In this manner, engine bleed air 15 is never directly introduced into the pressurized cabin 12 and a malfunction of the primary turbocharger 20 does not result in the bleed air 15 overheating the pressurized cabin 12.

Although the primary turbocharger 20 enables fresh air to be continuously introduced into the pressurized cabin 12, it is often desirable to either heat or cool that incoming air to maintain a comfortable temperature within the pressurized cabin 12. As has been previously stated, the first compressed air supply 25 created by the primary compressor 24 is heated by the compression. A bypass valve 26 is provided. If the bypass valve 26 is opened, the first compressed air supply 25 from the primary compressor 24 can be directed into the pressurized cabin 12. In this scenario, the air flows passively through secondary compressor 32. The bypass valve could also be positioned to additionally bypass compressor 32. Since the first compressed air supply 25 is hot, it can be used to provide a limited amount of heat to the pressurized cabin 12. A desired pressure is maintained within the pressurized cabin 12 through the use of a pressure dump valve 28 that releases any cabin pressure in excess of a preset amount.

Although the first compressed air supply 25 coming from the primary compressor 24 is warmed, it may not be hot enough to adequately heat the pressurized cabin 12 at high altitudes. Furthermore, the first compressed air supply 25 cannot directly cool the pressurized cabin 12, since it the outflow 25 is always higher than the ambient outside air temperature. To further condition the air, a secondary turbocharger 30 is provided. The secondary turbocharger 30 has a secondary compressor 32 and an expansion turbine 34. When the bypass valve 26 is closed, the first compressed air supply 25 from the primary compressor 24 is further compressed by secondary compressor 32 to typically three times to four times the pressure differential between the pressurized cabin and the ambient air. This produces a second compressed air supply 35. Accordingly, the second compressed air supply 35 produced by the secondary compressor 32 is both very hot and at high pressure.

A heat exchanger 36 is provided. The heat exchanger 36 is used to heat or cool the second compressed air supply 35 exiting the secondary compressor 32. The heat exchanger 36 is preferably a two-stage heat exchanger for more efficient cooling. The second compressed air supply 35 is cooled with an electric fan 38 when the aircraft is on the tarmac. This enables the heat exchanger 36 to function efficiently when the aircraft is not in motion. The heat exchanger 36 is cooled with ambient air that passes through an intake ram 39 when the aircraft is in flight for cabin cooling purposes. Accordingly, the second compressed air supply 35 enters the heat exchanger 36 and a cooled compressed air supply 40 exits the heat exchanger 36.

As the second compressed air supply 35 from the secondary compressor 32 passes through the heat exchanger 36 and becomes the cooled compressed air supply 40, it is cooled by the passing ambient air. However, the cooled compressed air supply 40 is still pressurized to a pressure that far exceeds the pressure of the cabin 12 when the bypass valve 26 is closed. To both reduce the pressure of the cooled compressed air supply 40 and to further cool the cooled compressed air supply 40, the cooled compressed air supply 40 is fed to the expansion turbine 34 of the secondary turbocharger 30. The pressure of the cooled compressed air supply 40 is lowered to slightly greater than that of the pressurized cabin 12 so that it will flow freely into the pressurized cabin 12. The expansion of the cooled compressed air supply 40 also results in a significant further cooling of the air. The cooled air can then be used to cool the pressurized cabin 12. The energy required to operate the secondary turbocharger 30 is supplied by the output pressure of primary turbocharger 20 and consists the majority of the pressure 25 exceeding the pressure of the aircraft cabin 12.

The expansion and corresponding cooling created by the expansion turbine 34 is not easily controlled. The degree of cooling is best controlled by adding heat or removing heat to the heat exchanger 36. This can be achieved by reducing the RAM airflow to the heat exchanger 36 or by adding heat to the heat exchanger 36 by directing the turbine output of the primary turbocharger 20 into the heat exchanger 36. The overall environmental control system 10 can therefore be used in a heating mode, wherein the ambient airflow through the heat exchanger 36 is stopped and extra heat is added to the heat exchanger 36. This will heat the air to a point where it still remains hot even after expansion in the expansion turbine 34. Heating can also be achieved by partially or completely opening the bypass valve 26. Accordingly, the pressurized cabin 12 can be heated using the environmental control system 10.

A centrifugal moisture separator 42 is provided. Whether the compressed air is heated or cooled, it passes through the centrifugal moisture separator 42. Within the separator 42, the air is forced to flow in tight vortexes. This causes moisture droplets to separate from the air and be collected. Typically, excess moisture will only be present at low flight altitudes, as the compressed air at high altitudes has low moisture content.

From the above, it will be understood that the environmental control system 10 can operate in several modes. In the low heat mode, the secondary turbocharger 30 is bypassed, the cooling RAM air is shut off, and the first compressed air supply 10 is directed into the pressurized cabin 12. In a high heat mode, the exhaust bleed air from turbine 22 is directed to the heat exchanger.

In a cooling mode, the bypass valve 26 is opened, bypassing the function of secondary turbocharger 30, and RAM air cools the compressed air from the primary turbocharger 20 before the compressed air enters the cabin 12.

In the air conditioning mode, the first compressed air supply 25 is advanced through the heat exchanger 36 and the secondary turbocharger 30. Ambient air cools the compressed air in the heat exchanger 36. The compressed air is further cooled by the expansion turbine 34. The cooled air is then introduced into the pressurized cabin 12.

Figure 2:
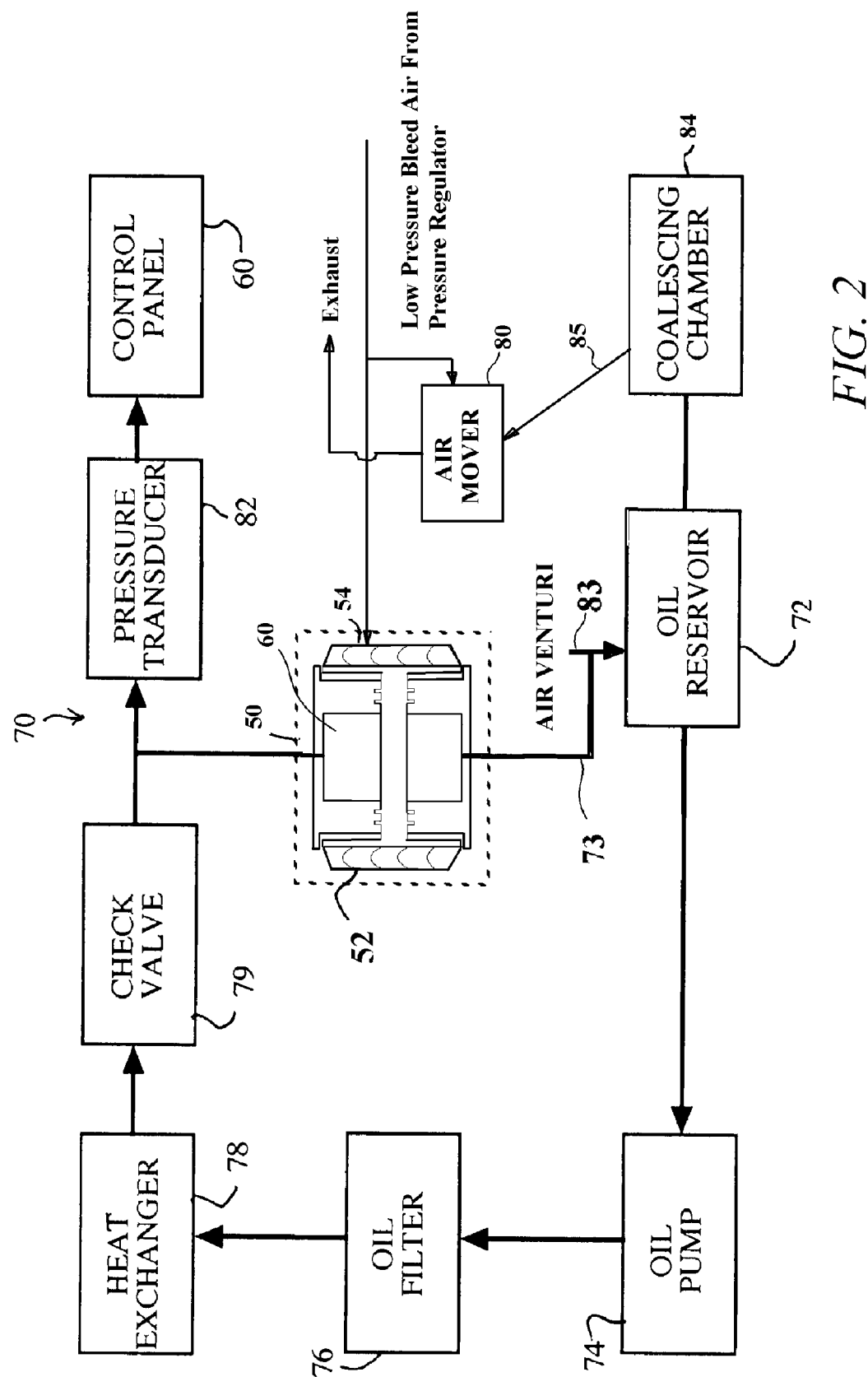
FIG. 2 is a schematic illustrating the lubrication system for a turbocharger.

The above-described environmental control system enables pressurized air to be either heated or cooled before it is introduced into a pressurized cabin 12. The pressurized air is compressed ambient air and contains no bleed air at all. Consequently, the compressed air does not contain any contaminants that are common within engine bleed air. However, the compressed air does pass through one or two turbochargers 20, 30 as it is heated or cooled. As has been previously mentioned, turbochargers 20, 30 can release lubricant fumes into the air they compress. Referring to FIG. 2, a solution to this problem is presented as a unique lubrication system for a turbocharger.

Figure 3:
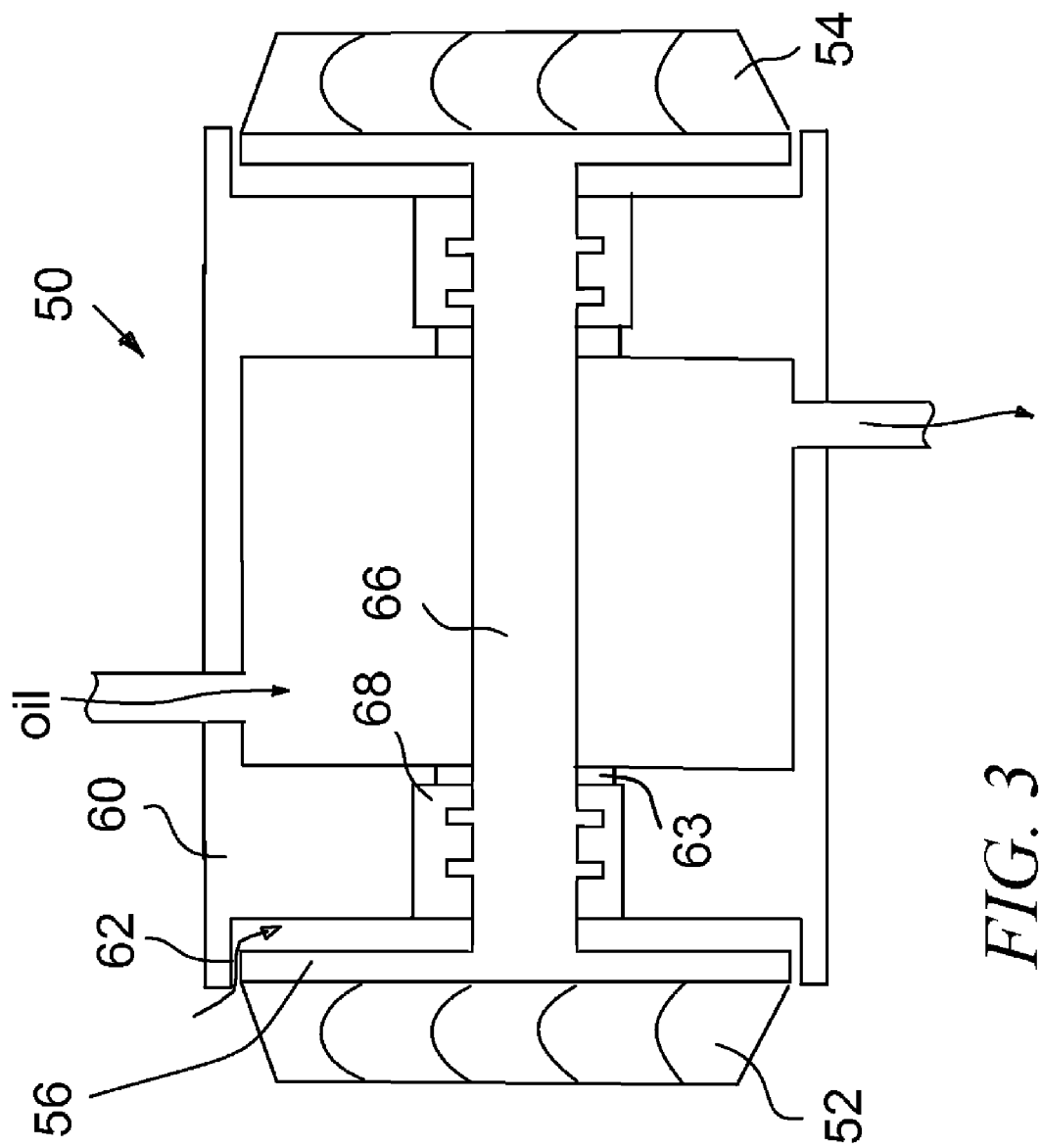
FIG. 3 shows a fragmented cross-sectional view of a portion of a turbocharger housing.

Referring to FIG. 2, a turbocharger 50 is shown. The turbocharger 50 is provided with a new reference number so as not to be confusing. However, it should be understood that the turbocharger 50 can be either the primary turbocharger or the secondary turbocharger previously described. The turbocharger 50 has a compressor fan 52 and a turbine fan 54. Both the turbine fan 54 and the compressor fan 52 have a base 56. The base 56 of both the turbine fan 54 and the compressor fan 52 are recessed within the turbocharger housing 60. Referring to FIG. 3 in conjunction with FIG. 2, it can be seen that the top surface 58 of each base 56 is recessed below the height of the housing 60. Furthermore, the base 56 has a smaller diameter than does the recess. The result is that an air gap 62 is present between the periphery of the base 56 and the surrounding housing 60. When the turbocharger 50 is spinning, each base 56 spins. This causes air around each base 56 to move outwardly due to centrifugal force. The gap 62 enables this air to move under the each base 56 and create a positive pressure region under each base 56 and around the shaft bearings 63. This helps inhibit any oil mist from leaking out of the shaft bearings 63.

To further inhibit leakage of lubricants through the shaft bearings 63, a shaft 66 and bearings 63 are supplemented by a labyrinth seal 68. However, the leakage of lubricants from the turbocharger housing 60 is primarily prevented by creating a negative pressure within the turbocharger housing 60 as part of the overall lubrication system 70. The overall lubrication system 70 (FIG. 2) has an oil reservoir 72 that holds a predetermined volume of oil. An oil pump 74 is used to draw oil from the reservoir 72 and circulates the oil throughout the lubrication system 70. The oil passes through an oil filter 76 to remove internal contaminants. The oil is also fed through a heat exchanger 78 that keeps the oil cool and prevents the oil from breaking down or otherwise being damaged by heat. A check valve 79 is provided to ensure the oil only flows in the proper direction and not air lock is created when the system is shut down. An oil pressure transducer 82 is provided that monitors the pressure of the oil in the lubrication system 70 and provides a signal to the pilot's control panel.

The oil lubricates the bearings 63 within the turbocharger 50. However, due to the high speed of rotation, liquid oil and an oil mist aerosol is produced within the housing 60. The oil mist cannot be directly fed back into the oil reservoir 72 because it would be vented before it could return to a liquid state. This would result in substantial oil loss from the system and requires oil to be replaced on a regular basis. In addition, the loss is substantial enough that it would contaminate the external surfaces of the aircraft. Separating the oil from the oil mist is a difficult problem that cannot be addressed by traditional oil filters or centrifugal spinners. Instead, oil separation is achieved in the present invention system by using an air mover 80 and a coalescing chamber 84 and the unique turbulent action of an air venturi 83 on the air/oil mist.

From FIG. 2, it can be seen that liquid oil 73 exiting the turbocharger 50 is directed back to an oil reservoir 72. The oil mist is directed to a vented coalescing chamber 84 that allows the oil mist to coalesce back into a flowing liquid. The coalescing chamber 84 has an air vent 85 that is routed to an exhaust vent in the aircraft. An air mover 80 is provided that draws air from the coalescing chamber 84 and creates a negative pressure in the coalescing chamber 84, the oil reservoir 72 and the turbocharger housing 60. The negative pressure creates a swirling action in the air venturi 83. The air mover 80 is a coanda valve. The air mover 80 receives low pressure bleed air from the output of the pressure regulator 16 (FIG. 1). The flow of bleed air through the air mover 80 creates a suction that draws air out of the coalescing chamber 84. It will therefore be understood that a negative pressure can be created in the turbocharger housing 60 whenever the engines of the aircraft are running. The aircraft need not be in flight.

Returning to FIG. 1, it will now be understood that the present invention environmental control system 10 allows engine bleed air 15 to power a turbocharger 20. The turbocharger 20 compresses fresh air and feeds that air into a pressurized aircraft cabin 12. The compressed fresh air being pumped into the pressurized cabin 12 can then be either heated or cooled to produce a desired temperature within the aircraft cabin 12. By using engine bleed air 15 only to power the turbocharger 20, the bleed air 15 never enters the aircraft cabin 12 and cannot overheat the aircraft cabin 12 if the turbocharger 20 fails.

The additional benefit of this novel invention is that there is a reduction in the bleed air flow as compared to the conventional method of pressurizing the aircraft cabin directly with engine bleed air. This reduction of required bleed air volume results in additional engine efficiency and reduced fuel consumption. This results in an energy saving in that there is an increase in cabin airflow as compared to the volume of bleed air that is used to drive the primary turbocharger to pressurize the cabin.

It will be understood that the embodiment of the present invention that is described and illustrated is merely exemplary and that a person skilled in the art can make many variations to the shown embodiment using functionally equivalent components and configurations. All such alternate embodiments, modifications and variations are intended to be included within the scope of the present invention, as defined by the claims.

What is claimed is:

1. In an aircraft having a pressurized cabin and an engine that produces compressed engine air, an environmental control system for the aircraft having an air conditioning mode and a heating mode, comprising:

a primary turbocharger having a first turbine and a first compressor, wherein said first turbine is powered by the compressed engine air, wherein said first compressor draws fresh ambient air from outside the aircraft and creates a first compressed air supply without ever exposing said first compressed air supply to the compressed engine air;

a secondary turbocharger having a second compressor and an expansion turbine, wherein said second compressor further compresses said first compressed air supply to create a higher pressure second compressed air supply;

a heat exchanger that cools said higher pressure second compressed air supply to create a cooled compressed air supply, wherein said cooled compressed air supply powers said expansion turbine;

a bypass having an open condition and a closed condition, said bypass being in said open condition when said environmental control system is operating in said heating mode, wherein said bypass causes the first compressed air supply to bypass both the heat exchanger and said expansion turbine of said secondary turbocharger and flow into said pressurized cabin, and said bypass being in said closed condition when said environmental control system is operating in said air conditioning mode, wherein said bypass directs the first compressed air supply into said heat exchanger, and said heat exchanger cools said second compressed air supply with ambient air to create said cooled compressed air supply, and wherein said cooled compressed air loses heat and pressure at said expansion turbine to become a conditioned air supply;

wherein said conditioned air supply is introduced into said pressurized cabin.

2. The system according to claim 1, further including an electric fan for cooling said heat exchanger with ambient air.

3. The system according to claim 1, further including a ram scoop for scooping ambient air in flight and directing said ambient air to said heat exchanger to cool said heat exchanger.

4. The system according to claim 1, wherein said primary turbocharger has a housing and a negative pressure is created in said housing for inhibiting leakage of lubrication oil into said first compressed air supply.

5. The system according to claim 1, further including a lubrication arrangement for said primary turbocharger that supplies oil to a housing of said primary turbocharger, wherein said lubrication arrangement includes an air mover for creating a negative pressure within said housing.

6. The system according to claim 5, wherein said lubrication arrangement further includes a coalescent chamber, wherein said air mover creates a negative pressure within said coalescent chamber.

7. The system according to claim 6, wherein said air mover is powered by said compressed engine air.

8. The system according to claim 1, further including a pressure regulator for regulating said compressed engine air used to power said primary turbocharger.

9. The system according to claim 8, further including a pressurization controller for selectively controlling said pressure regulator.

\* \* \* \* \*